(12) United States Patent
Veyseh et al.

(10) Patent No.: US 8,942,303 B1
(45) Date of Patent: Jan. 27, 2015

(54) PILOT ASSISTED CHANNEL ESTIMATION

(71) Applicant: SiTune Corporation, San Jose, CA (US)

(72) Inventors: Marzieh Veyseh, Los Altos, CA (US); Mahdi Khoshgard, Los Gatos, CA (US)

(73) Assignee: SiTune Corporation, San Jose, CA (US)

( * ) Notice: Subject to any disclaimer, the term of this patent is extended or adjusted under 35 U.S.C. 154(b) by 0 days.

(21) Appl. No.: 14/088,145

(22) Filed: Nov. 22, 2013

(51) Int. Cl.
H04L 27/28 (2006.01)
H04L 25/02 (2006.01)
H04L 27/26 (2006.01)

(52) U.S. Cl.
CPC .......... *H04L 25/0232* (2013.01); *H04L 27/265* (2013.01); *H04L 25/0204* (2013.01)
USPC ........................................................ 375/260

(58) Field of Classification Search
CPC . H04L 5/0048; H04L 25/022; H04L 25/0204; H04L 5/0007; H04L 25/0212; H04L 1/0668; H04L 27/2601; H04L 25/0236; H04L 25/03292; H04L 27/261; H04L 2025/03414; H04L 25/0202; H04L 27/2675; H04B 2201/70701; H04B 7/0626
USPC ........................................................ 375/260
See application file for complete search history.

(56) References Cited

U.S. PATENT DOCUMENTS

| | | | |
|---|---|---|---|
| 2011/0149929 A1* | 6/2011 | Kleider et al. | 370/338 |
| 2012/0243630 A1* | 9/2012 | Golovins | 375/260 |
| 2013/0051489 A1* | 2/2013 | Singh et al. | 375/295 |
| 2013/0064313 A1* | 3/2013 | Gatti et al. | 375/260 |
| 2014/0198877 A1* | 7/2014 | Van Nee | 375/295 |

* cited by examiner

*Primary Examiner* — Don N Vo
(74) *Attorney, Agent, or Firm* — Novak Druce Connolly Bove + Quigg LLP

(57) ABSTRACT

Systems and methods are described for the implementation of a receiver that includes a channel estimation block that uses known pilots to estimate the value of channel gain and phase at data subcarrier indexes. Time interpolation as well as an auto regression filter can be to estimate the channel gain and phase at the "missing" pilot indexes as well as frequency interpolation to estimate the value of the channel at data subcarrier indexes.

20 Claims, 8 Drawing Sheets

PILOT ASSISTED CHANNEL ESTIMATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to the field of communications, and more specifically to pilot-aided channel estimation for orthogonal frequency division multiplexed (OFDM) transmission.

BACKGROUND

In the age of rapid innovations in the field of telecommunications, the requirements for communication devices that enable faster, cheaper and more reliable data transfer is escalating. Orthogonal frequency-division multiplexing (OFDM) has developed as a method for reliable, high-volume data transfer in both wired and wireless mediums to transfer data and compensate for the effects of distortion at the receiver side. Wideband digital applications such as digital television, audio broadcasting, wireless networking, and broadband internet have become popular applications for OFDM transmission. When a signal travels through a transmission medium, such as a cable or air, the signal is affected and distorted due to multipath effects. This distortion is generally considered as the "channel". Several approaches have been proposed to estimate the channel. In one such approach, cross-talk between subchannels can be eliminated by selecting subcarrier frequencies such that the subcarrier frequencies are orthogonal to each other. If the channel is accurately estimated, its effects can be compensated and the transmitted signal can be recovered more accurately. However, a solution is needed for the estimation of channel when "pilots" of pre-defined amplitude and phase are inserted into the signal at regular intervals in both time and frequency, where the pilots can be used by the receiver to estimate changes in channel response in both time and frequency dimensions.

BRIEF DESCRIPTION OF THE DRAWINGS

Various embodiments in accordance with the present disclosure will be described with reference to the drawings, in which.

DETAILED DESCRIPTION

Figure 1:
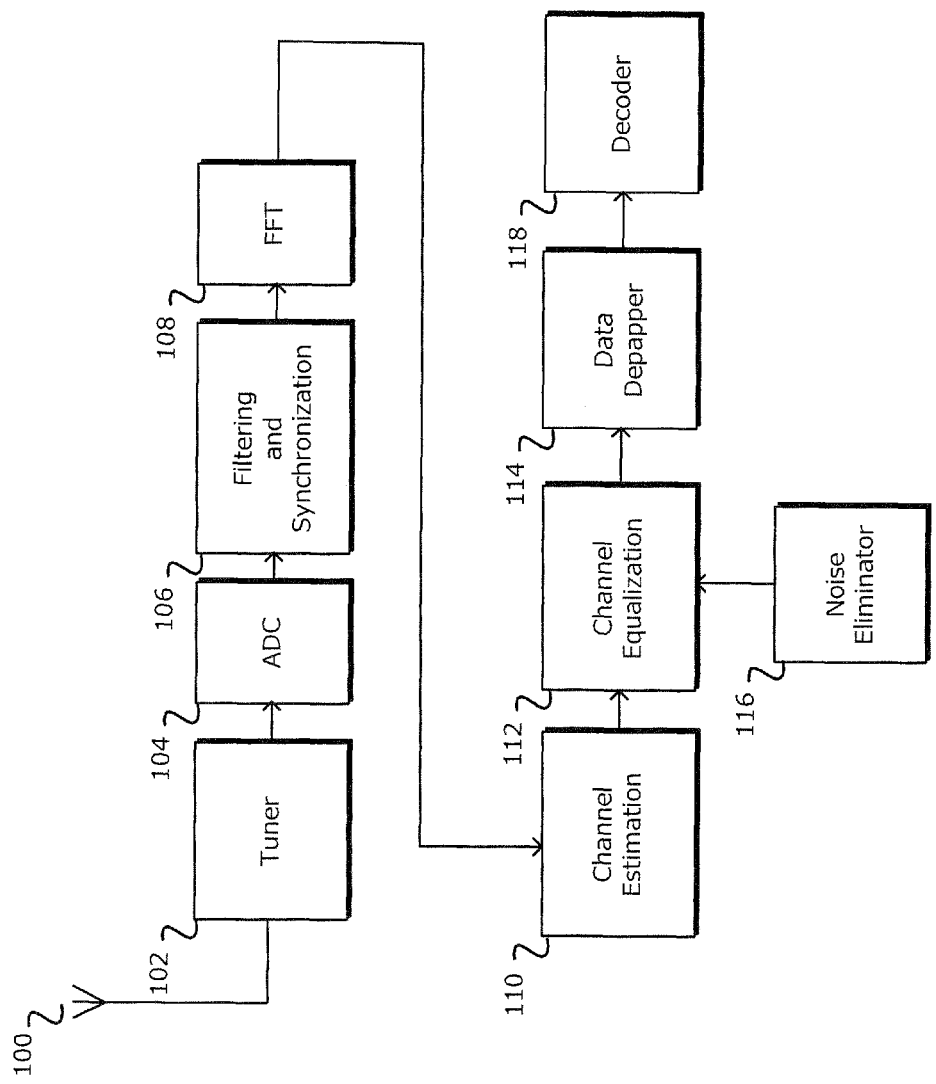
FIG. 1 illustrates an example of an OFDM receiver with a channel estimation component and a channel equalization component, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for wireless and/or wired communication. In particular, various embodiments describe systems and methods for pilot-aided channel estimation for orthogonal frequency division multiplexed (OFDM) communication systems, such as digital video broadcasting (DVB), audio broadcasting, and cable transmissions, among other. In general, a receiver including a channel estimation system can use known pilot subcarriers to estimate the channel (i.e., channel gain and channel phase) at data subcarrier indexes. By estimating the channel and applying an inverse function of the channel to a received OFDM transmission, an original transmitted OFDM transmission can be equalized (i.e., recovered) from an affected received OFDM transmission.

In accordance with various embodiments, a channel estimation system can utilize, for example, at least a time interpolation component as well as an auto regression filter to estimate the channel of "missing" pilot indexes as well as a frequency interpolation component to estimate the value of channel at data subcarrier indexes for an OFDM symbol. For example, at every OFDM symbol in an OFDM transmission, there can exist some indexes that carry data subcarriers, while in previous or next OFDM symbols of the OFDM transmission, the same indexes can carry pilot subcarriers. Time interpolation can be used to estimate the channel at these pilot subcarriers from pilot subcarriers of previous OFDM symbols and future OFDM symbols relative to a reference OFDM symbol and frequency interpolation can be used to estimate the value of channel at data subcarrier indexes for an OFDM symbol. In accordance with various embodiments, an OFDM symbol corresponds to a symbol rate (also known as baud or modulation rate), which is the number of symbol changes (waveform changes or signalling events) made to the transmission medium per second using a digitally modulated signal or a line code. The Symbol rate can be measured in baud (Bd) or symbols/second. In the case of a line code, the symbol rate is the pulse rate in pulses/second. Each symbol can represent or convey one or several bits of data.

For example, the channel estimation system can receive an OFDM transmission that includes a plurality of OFDM symbols, where each of the OFDM symbols can include data subcarriers and pilot subcarriers. In this example, the plurality of OFDM symbols can be stored in one or more memory components upon being received. The number of memory components can depend on a repetition period of the pilot subcarrier patterns of the OFDM transmission. In various embodiments, the repetition period can be set by a transmitter of the OFDM transmission. For example, the transmitter can determine which one of a plurality of pilot patterns is suitable for a specific transmission and can store information indicated of the pilot pattern in a header portion of the OFDM transmission. The receiver, upon receiving the OFDM transmission, can determine the repetition period by the selected pattern. In this way, if pilot pattern number three was selected, the receiver can index an appropriate interpolation filter (as well as weights for the interpolation filter) for the channel estimation system.

In various embodiments, upon receiving the OFDM transmission at the receiver, a Fast Fourier Transmission (FFT) of the transmission is computed. As described, the OFDM transmission includes a plurality of OFDM symbols. Accordingly, a FFT of the OFDM transmission includes computing a FFT of each OFDM symbol in the transmission. Upon computing the FFT of an OFDM symbol, the FFT of the symbol is stored to one of the memory components. For example, for an OFDM transmission that includes at least a first, a second, and a third OFDM symbol, upon computing a FFT of the first OFDM symbol, the output can be stored to one of the memory component. In this example, the output of the FFT for the first OFDM symbol can be stored in the N-$d_{th}$ memory component, where d is the repetition period and N is the number of the current OFDM symbol received in the OFDM transmission (e.g., the tenth OFDM symbol of the OFDM transmission). The output of the FFT for the second OFDM symbol can be stored in the N-$1_{th}$ memory component and the output of the FFT for the first OFDM can be stored in the $N_{th}$ memory component. An equalizer can use a de-multiplexer to extract data subcarriers from the output of the N-$d_{th}$ memory component and can use the result of a channel estimation block that includes information from pilot subcarriers of the $N_{th}$ until N-$d_{th}$ OFDM symbol, as well as information from N-d-$1_{th}$ OFDM symbol until N-$2d_{th}$ OFDM symbol. In accordance with various embodiments, determining the result of the channel estimation block can include estimating a channel value at pilot subcarrier indexes for a current symbol "N" of the plurality of OFDM symbols, estimating a first channel value at pilot subcarrier indexes for a first grouping of OFDM symbols (i.e., $n_{th}$ until n-d) and a second channel value at pilot subcarrier indexes for a second grouping of OFDM symbols (n-d-$1_{th}$ until n-2d) based at least in part on the estimate of a channel value of the pilot subcarrier indexes for the current symbol, estimating a channel value at pilot subcarrier indexes for a reference symbol (n-d) by taking a weighted average of the first grouping of OFDM symbols and the second grouping of OFDM symbols, and estimating, using at least one frequency interpolation function, a channel value at data subcarrier indexes for the reference symbol based at least in part on the estimated channel at pilot indexes of the reference symbol.

Various other applications, processes, and uses are presented below with respect to the various embodiments.

OFDM is a method of encoding digital data on multiple carrier frequencies where a large number of closely spaced orthogonal subcarrier signals are used to carry data on several parallel data streams or channels. Each subcarrier signal is modulated with a conventional modulation scheme (such as quadrature amplitude modulation or phase-shift keying, etc.) at a low symbol rate, maintaining total data rates similar to conventional single-carrier modulation schemes in the same bandwidth. As described, a solution is needed for channel estimation when OFDM is in use and known pilots of predefined amplitude and phase are inserted into the signal at regular intervals in both time and frequency directions. Accurate channel estimation in an OFDM receiver is important for the recovery of the transmitted information data at the receiver. If the receiver makes a significant error in its channel estimation, the original modulation symbol can be decoded in error because each subcarrier in the OFDM symbol is multiplied by fading coefficients that have different amplitudes and phases. Further, a solution is needed for efficient estimation of channel when different pilot spacing may be in place based at least in part on the guard interval to provide a range of efficiency and to increase capacity by increasing the pilot spacing for small channel delay spreads. Further still, the solution should consider efficient channel estimation by using pilot subcarriers from previous and next OFDM symbols with minimum memory requirements when channel is not heavily suffered from the Doppler Effect. Accordingly, in accordance with various embodiments, a channel estimation block at a receiver can use known pilots to estimate the value of channel gain and phase at data subcarrier indexes. A time interpolation component as well as an auto regression filter or other similar filter can be used to estimate the channel gain and phase of the "missing" pilot indexes and a frequency interpolation component can be used to estimate the value of the channel at data subcarrier indexes. By estimating the value of the channel at the data subcarrier indexes and applying an inverse function of the channel to a received OFDM transmission, an original transmitted OFDM transmission can be equalized from an affected received OFDM transmission.

FIG. 1 illustrates an example of an OFDM receiver with a channel estimation component and a channel equalization component, in accordance with various embodiments. In this example, a signal (e.g., an OFDM transmission) can be received through an antenna 100. The signal can be provided to a tuner 102, where the signal can be amplified, filtered, and/or down-converted, for example to a baseband or intermediate frequency (IF). After the tuner, the signal can be provided to an analog to digital converter (ADC) 104 for analog to digital conversion. The signal can then be provided to a filtering and synchronization component 106 for further filtering and synchronization and then to a Fast Fourier Transform (FFT) component 108. The FFT component 108 can output OFDM symbols. The OFDM symbols can be provided to a channel estimation component 110, where the channel can be estimated based on the pilot signals. OFDM symbols, the estimated channel, as well as noise power data from a noise estimator component 116 can be provided to the channel equalization component 112, where equalized data values can be produced. The equalized data values can then be provided to a data demapper 114 and to a decoder 118 for further processing.

Figure 2:
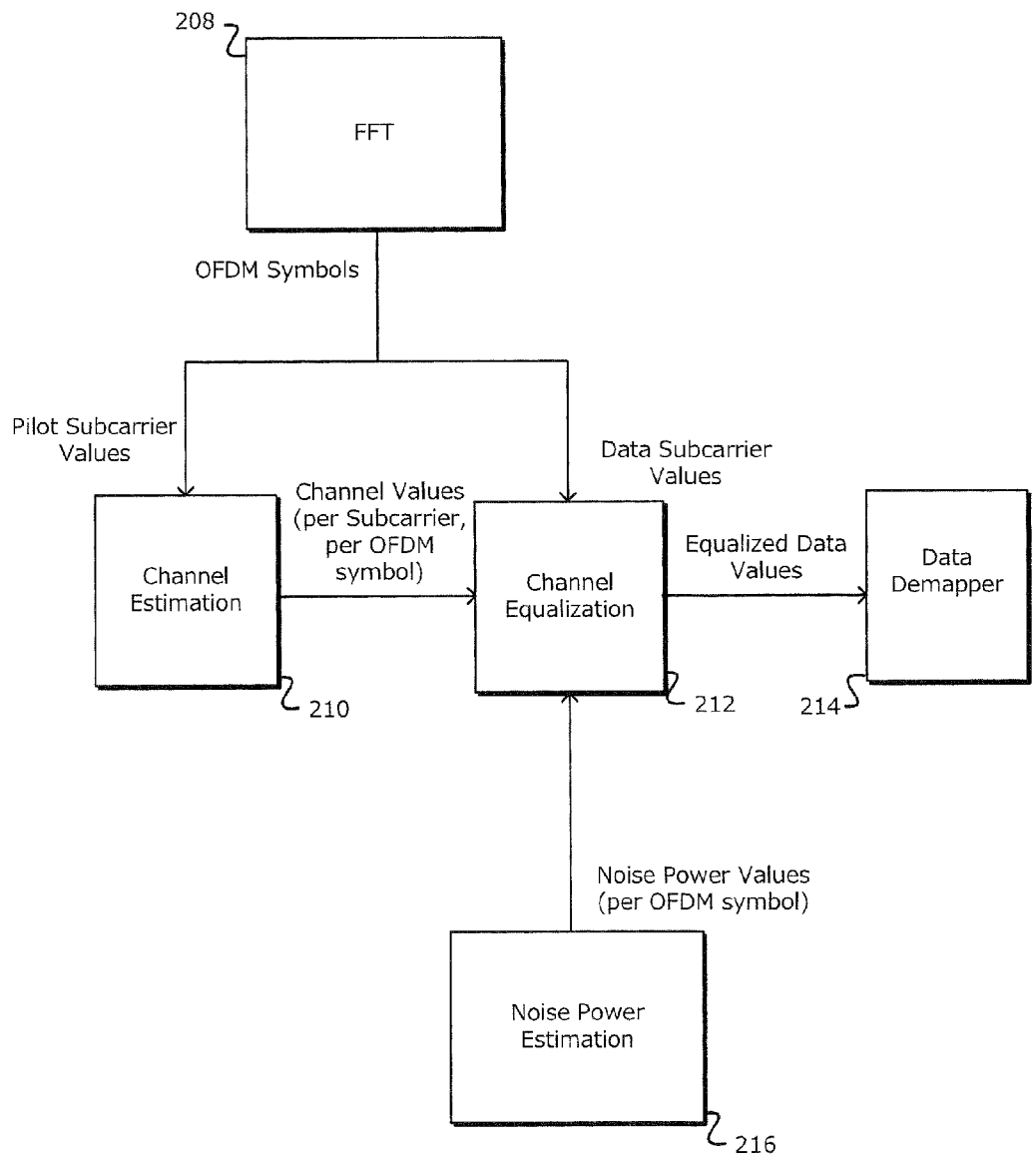
FIG. 2 illustrates an example of a channel estimation component and a channel equalization component, in accordance with various embodiments.

FIG. 2 illustrates an example of a channel estimation component and a channel equalization component, in accordance with various embodiments. In this example, OFDM symbols can be provided from the FFT component 208. Pilot subcarrier values can be provided to a channel estimation component 210 and data subcarrier values can be provided to a channel equalization component 212. The channel estimation component 210 can estimate the channel in data subcarriers based on the pilot subcarrier values, as will be described in greater detail below. In various embodiments, a channel in every subcarrier, in every OFDM symbol can be estimated. The estimated channel values from the channel estimation component 210, data subcarrier values from the FFT component 208, and noise power data per OFDM symbol from a noise power estimation component 216 can be provided to the channel equalization component 212. The channel equalization component 212 can adjust data subcarrier values (i.e., equalize the values), based on the estimated channel in each subcarrier value and the noise power data. The equalized data values can be provided to a data demapper 214 for further processing.

In accordance with various embodiments, a channel estimation block at a receiver can use known pilot subcarriers to estimate the value of channel gain and phase at data subcarrier indexes. Time interpolation as well as an auto regression filter or other similar filter can be used to estimate the channel gain and phase of the "missing" pilot indexes as well as frequency interpolation to estimate the value of the channel at data subcarrier indexes. To increase capacity when channel delay spread is small, known pilot subcarriers can have different patterns in time and frequency. The pilot patterns can be repeated in time where the repetition period can depend on the channel characteristic and its variation in period with time. At every OFDM symbol, there can exist some indexes that carry data subcarriers, while at the previous or next OFDM symbols, the same indexes can carry pilot subcarriers. The channel gain and phase at these pilot indexes can be estimated using pilot values from previous and future/next OFDM symbol by means of time interpolation. The channel in the remaining, non-pilot subcarriers can be estimated based on the estimated channel in the pilot subcarriers. Once the channel is estimated, channel equalization can be performed to compensate the data signals for the channel to recover the original transmitted data.

Figure 3:
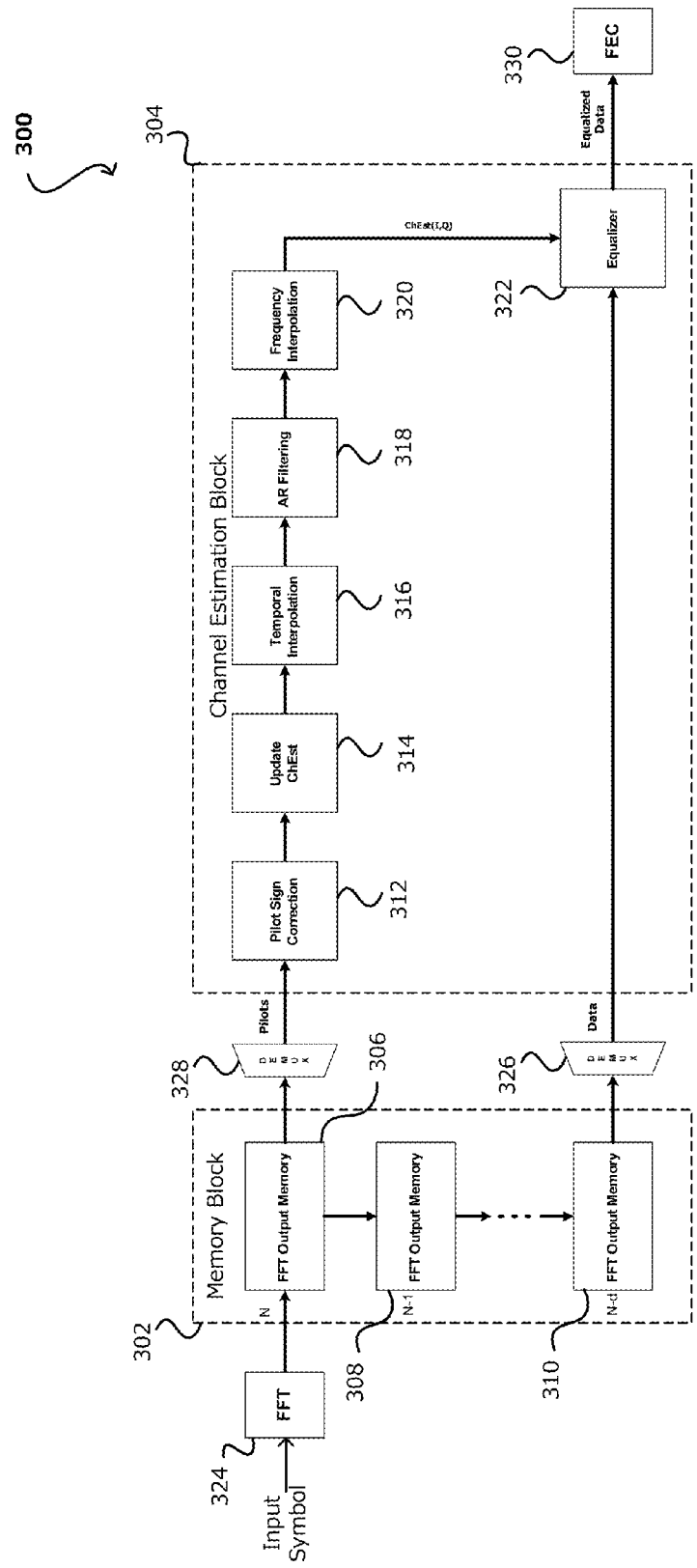
FIG. 3 illustrates an example block diagram for channel estimation and equalization in accordance with various embodiments.

For example, FIG. 3 illustrates an example block diagram for channel estimation and equalization in a receiver in accordance with various embodiments. In an OFDM transmission, each transmitted subcarrier of the OFDM transmission can be affected by the environment and the medium through which the signal travels as the signal is being transmitted. In accordance with various embodiments, channel estimation can be performed to determine the channel in an OFDM transmission by estimating the channel in the subcarriers. The channel in subcarriers in an OFDM transmission can be estimated based on pilot subcarriers. The channel in pilot subcarriers can be estimated at the receiver based on a measured subcarrier value and an expected, known subcarrier value. The channel in the remaining, non-pilot subcarriers can be estimated based on the estimated channel in pilot subcarriers. Accordingly, the channel can be estimated in every subcarrier of every OFDM symbol and once the channel is estimated, channel equalization can be performed to compensate the data signals for the channel to recover the original transmitted data.

As shown in example 300 of FIG. 3, a receiver, such as an OFDM receiver or other receiver, can include, for example, a memory block 302 and a channel estimation block 304. The memory block 302 can include a series of memory components, e.g., fast Fourier Transform (FFT) output memory components 306, 308, 310. The channel estimation block 304 can include, for example, a pilot sign correction component 312, an update channel estimation component 314, a temporal interpolation component 316, an auto regression (AR) filtering component 318, a frequency interpolation component 320, and an equalizer 322. It should be noted that the receiver can include any device that can convert a signal from a modulated radio wave into usable information. Example receivers can include consumer audio receivers (e.g., hi-fi/home theater, portable radios (e.g., transistor radios that can receive AM, FM, or short wave broadcast bands), etc.

An input OFDM symbol is received at a FFT unit 324. The FFT unit computes the Fourier Transform of the input OFDM symbol and the output of the FFT unit is provided to the series of memory components, e.g., FFT output memory components (306, 308, 310). In accordance with various embodiments, the number of memory components, d, can depend on a repetition period of the pilot patterns in time. The N-$d_{th}$ previous OFDM symbol is stored in the last memory component (i.e., the n-$d_{th}$ memory unit). The equalizer can use a de-multiplexer to extract data subcarriers from the output of the last memory component and can use the result of the channel estimation block that had information from pilots of the $N_{th}$ until N-$d_{th}$ OFDM symbol, as well as information from N-d-$1_{th}$ until N-$2d_{th}$ OFDM symbol.

For example, de-multiplexer 326 can extract data subcarriers from the output of memory component 310 and the data subcarriers can be provided to the equalizer. De-multiplexer 328 can extract pilot subcarriers from the output of N until N-$d_{th}$ memory components. The equalizer can use the result of the channel estimation block (e.g., components 312-320) that had information from pilot subcarriers of the $N_{th}$ until N-$d_{th}$ OFDM symbol, as well as data subcarriers from N-d-$1_{th}$ until N-$2d_{th}$ OFDM symbol to estimate the channel. The equalized data symbol can be provided to the forward error correction (FEC) 330 or channel coding component to decode the input data and control errors in data transmission over unreliable or noisy communication channels. Accordingly, embodiments provide a solution to perform interpolation in time by considering pilot subcarrier information from the previous d OFDM symbols as well as the next or future d OFDM symbols. The equalized data symbol enters the FEC or channel coding component to decode the input data and control errors in data transmission over unreliable or noisy communication channels.

Figure 4:
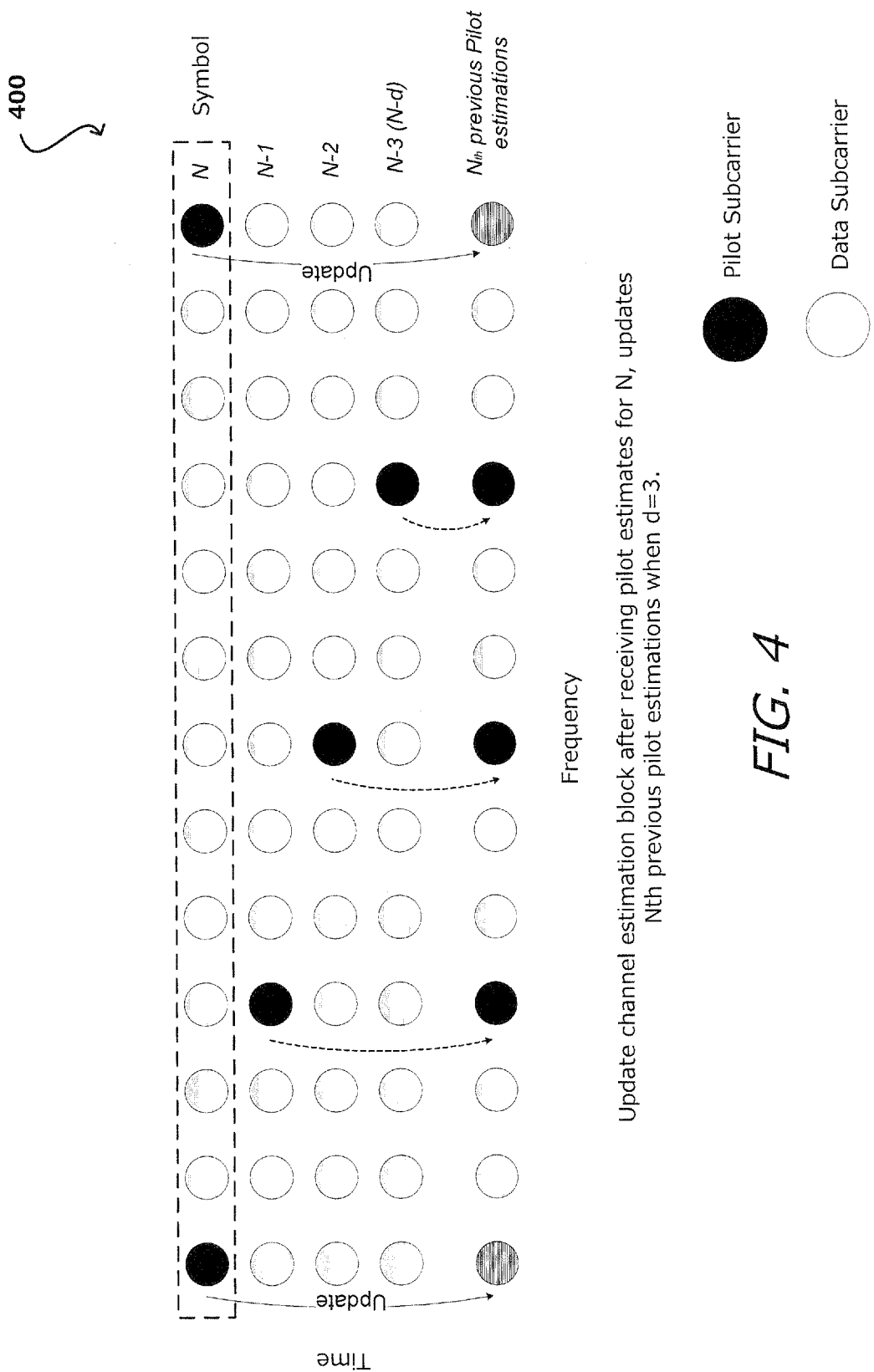
FIG. 4 illustrates a sample pilot symbol grid used for channel estimation in accordance with various embodiments.
Figure 5:
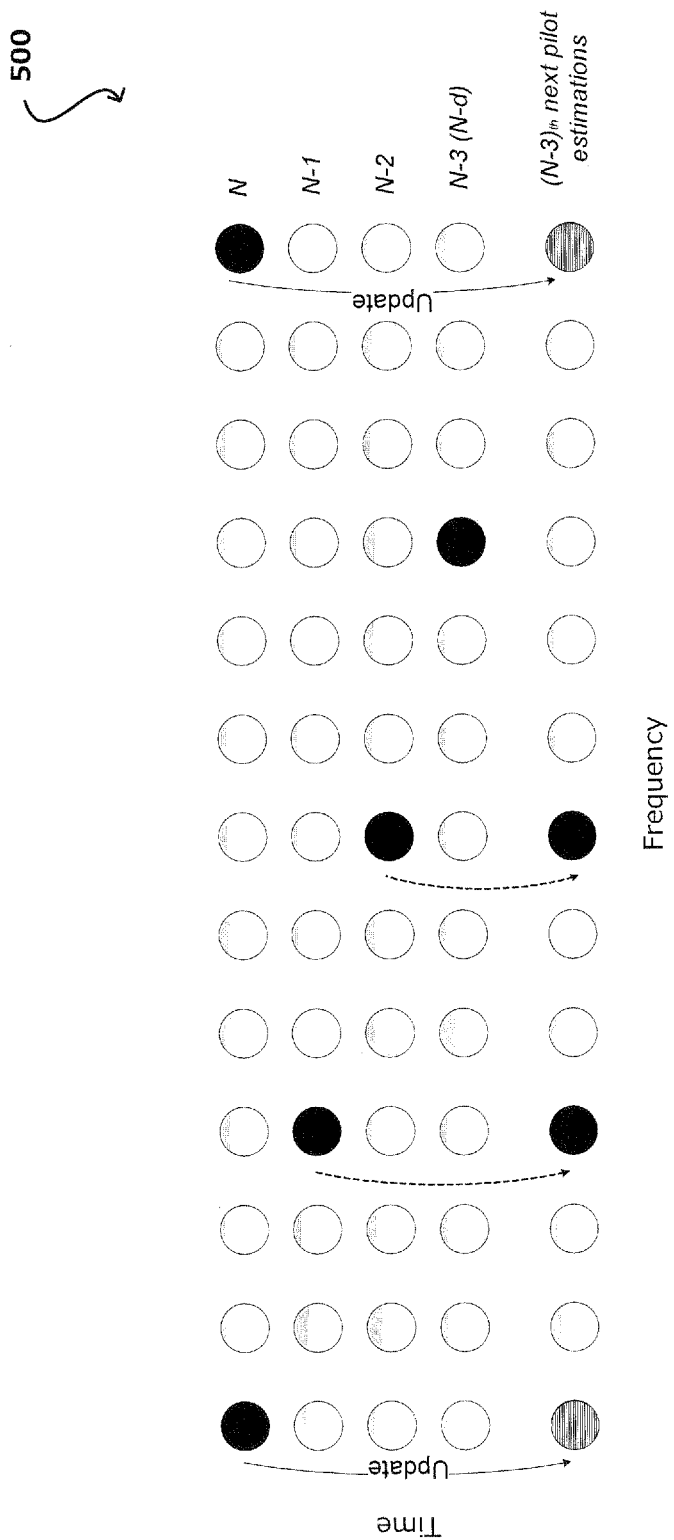
FIG. 5 illustrates a sample pilot symbol grid used for channel estimation in accordance with an alternate embodiment.

As described, the grouping of previous OFDM symbols and the grouping of next/future OFDM symbols can be used to interpolate the value of channel estimates for pilot subcarriers over time to determine the value of channel for data subcarriers. FIG. 4 illustrates an example of updating a channel block for grouping of previous OFDM symbols and FIG. 5 illustrates an example of updating a channel block for grouping of future/next OFDM symbols.

FIG. 4 illustrates an example 400 of updating a channel estimate block for $N_{th}$ previous pilot estimations upon receiving N number of pilot estimates, in accordance with an embodiment. In this example, the number of memory components "d" is three. Each horizontal row of circles represents an OFDM symbol and each vertical row of circles represents a subchannel. The horizontal axis represents frequency and the vertical axis represents time. The frequency of the subchannels can increase from left to right. The solid circles are pilot subcarriers and the other circles are data subcarriers. The distance in time, or the repetition factor, between the pilot subcarriers in this example is three. It should be noted that various types of OFDM signals in various standards may contain different numbers and configurations of pilot subcarriers, data subcarriers, than illustrated in FIG. 4. As one skilled in the art would appreciate, this disclosure is not limited to any particular configuration or type of OFDM signal.

In accordance with various embodiments, as OFDM symbols are processed, the channel estimation system can update the channel value of the pilot subcarriers. As described, channel estimation can be performed to measure the channel in an OFDM transmission. The channel in an OFDM transmission can be estimated by estimating the channel in the subcarriers. In various embodiments, the channel in subcarriers in an OFDM transmission can be estimated based at least in part on pilot subcarriers. The channel in pilot subcarriers can be estimated at the receiver based at least in part on a measured subcarrier value and an expected, known subcarrier value. For example, the channel in the pilot subcarriers can be based on expected values, for example, by dividing the measured value of the pilot subcarriers by the expected value of the pilot subcarrier. The channel in the remaining, non-pilot subcarriers can be estimated using methods of interpolation based on the estimated channel in pilot subcarriers. Accordingly, the channel can be estimated in every subcarrier of every OFDM symbol. Once the channel is estimated, channel equalization can be performed to compensate the data subcarriers for the channel to recover the original transmitted data.

In this example, a pilot sign correction component (e.g., component 312 of FIG. 3) is responsible for dividing the pilot subcarriers with pre assigned gain and sign to estimate the value of the channel at the pilot indexes for the current OFDM symbol. For example, as shown in FIG. 4, upon receiving a new OFDM symbol, the channel estimation system can update the pilot subcarriers for previous pilot subcarrier estimates and future/next pilot subcarrier estimates, where the updated channel value for each pilot is determined by dividing the received pilot value by an expected channel value known at the receiver.

FIG. 5 illustrates an example 500 of updating a channel estimate block for N-d future pilot estimations upon receiving N number of pilot estimates, in accordance with an embodiment. As described, the channel value estimates for pilot subcarriers from previous and next OFDM symbols can be interpolated over time to determine the value of channel in data subcarriers. In this example, the updated channel estimation component (e.g., component 314 of FIG. 3) is responsible for using the new channel estimates at the current pilot indexes to update the value of the channel at all pilot indexes. For example, the update channel estimation component can pass pilot estimates from the $N_{th}$ until $N-d+1_{th}$ OFDM symbol (i.e., next/future OFDM symbols) as well as channel estimates for all pilots based on the $N-d-1_{th}$ until $N-2d_{th}$ OFDM symbol for the $N-d_{th}$ (previous OFDM symbols) OFDM symbol. For example, as shown in FIG. 5, upon receiving a new OFDM symbol, the channel estimation system can update the pilot subcarriers for future pilot subcarrier estimates, where the updated channel value for each pilot can be determined by dividing the received pilot value by an expected channel value known at the receiver.

Figure 6:
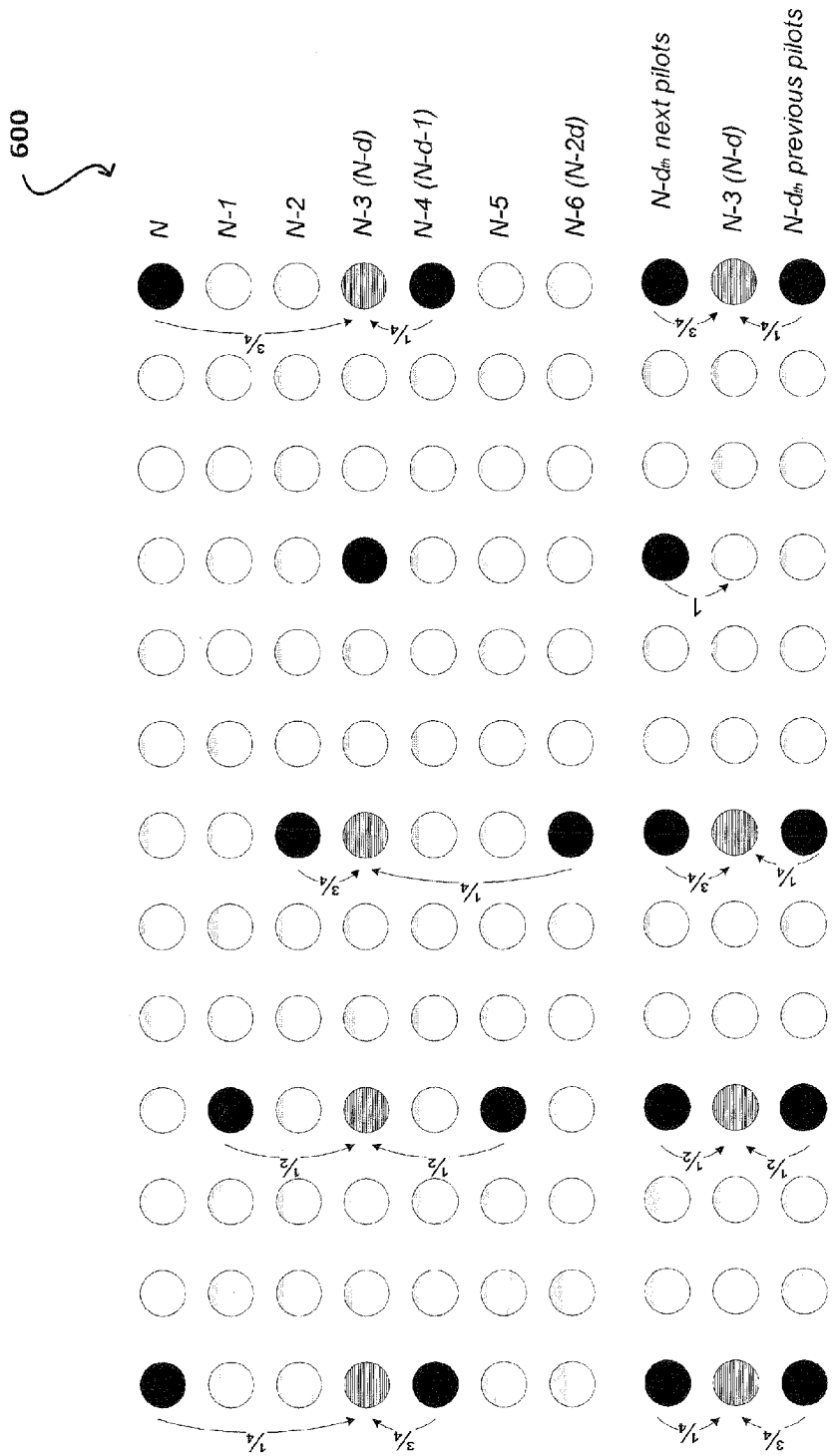
FIG. 6 illustrates a sample pilot symbol grid used for channel estimation after temporal interpolation takes a weighted average of the channel at assigned pilots.

As described, the previous OFDM symbols and the next/future OFDM symbols can be used to interpolate the value of channel estimates on pilots over time to determine the value of channel of data subcarriers. Upon updating the channel block for previous OFDM symbols and updating the channel block for future/next OFDM symbols, a weighted average of the channel block can be taken. For example, FIG. 6 illustrates an update of the channel estimate block after the temporal interpolation component computes a weighted average of the channel at assigned pilots from three previous and three next OFDM symbols when the number of memory components is three (d=3). In this example, the temporal interpolation component (e.g., component 316 of FIG. 3) can use the value of channel from the $N_{th}$ until $N-d+1_{th}$ OFDM symbol as well as the updated value of the channel at pilot indexes from $N-d-1_{th}$ until $N-2d_{th}$ OFDM symbols. For example, the temporal interpolation block can compute a weighted average of the pilot values at each given index. As shown in example 600 of FIG. 6, as a result of this averaging, all pilot indexes at the $N-d_{th}$ OFDM symbol have an estimated channel value that is averaged in time using d previous and d next OFDM symbols. In various embodiments, subcarrier pilot values for an OFDM symbol that was received earlier in time are weighted higher than subcarrier pilot values of an OFDM symbol that was received later in time.

Figure 7:
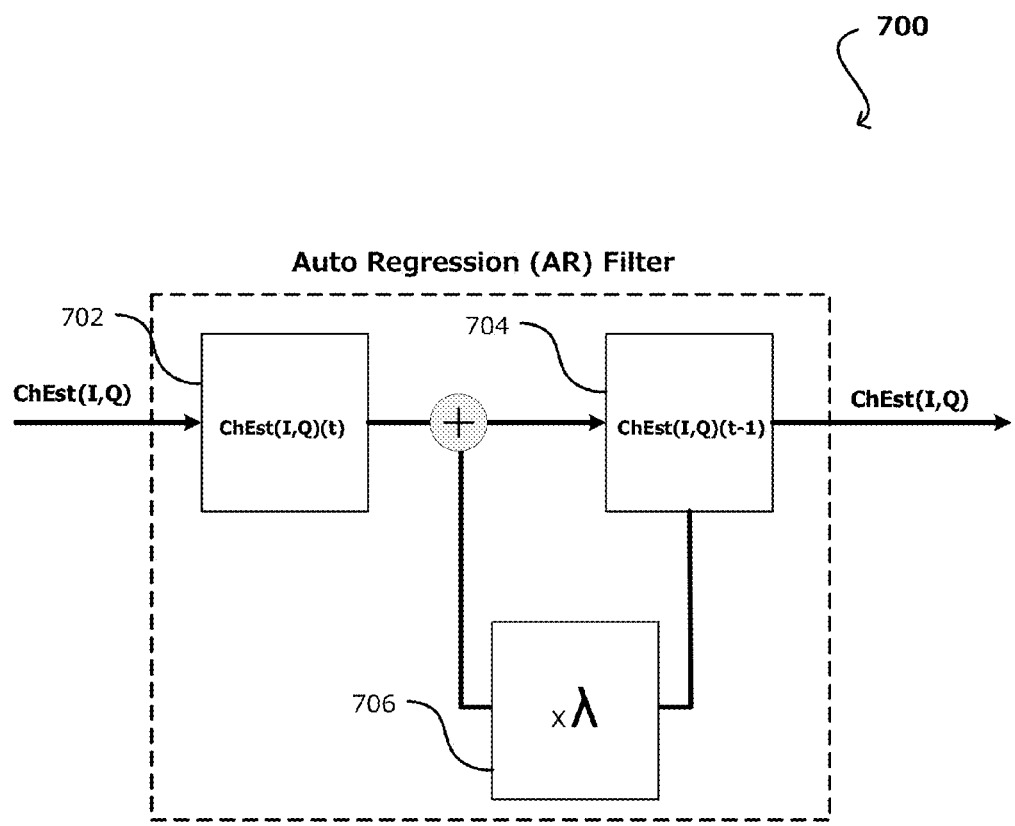
FIG. 7 illustrates an example block diagram of an auto regression filter in accordance with various embodiments.

FIG. 7 illustrates a block diagram of an auto regression filter 700, in accordance with an embodiment. As shown in FIG. 7, the auto regression filter (e.g., component 318 of FIG. 3) can compute a weighted average of the estimated channel values at the $N-d_{th}$ OFDM symbol (i.e., the current estimation of the channel block) 702 with the result of the channel estimation at all pilot indexes after time interpolation for $N-d-1_{th}$ OFDM symbol (i.e., the result of the value of the channel estimation block previous to the current value of the channel estimation block) 704. In accordance with various embodiments, the value of the weight 706 can be adjusted, where the higher the value, previous or past channel estimates are weighted more heavily, and the lower the value, current channel estimates are weighted more heavily. In accordance with various embodiments, a frequency interpolation component (e.g., component 320 of FIG. 3) can interpolate the value of the channel at data subcarrier indices based on the estimated channel at pilot subcarrier indices. Since capacity is increased by increasing pilot spacing for small channel delay spreads, different pilot spacing's may be in place depending on the guard interval as to achieve a range of efficiency. The frequency interpolation component can use different filter coefficients for different pilot spacing. The output of the frequency interpolation can contain an estimation of the channel at all subcarriers. The equalizer can compensate the effects of the channel on the signal through division or other techniques. The equalized data symbol enters the forward error correction (FEC) or channel coding component to decode the input data and control errors in data transmission over unreliable or noisy communication channels. In various embodiments, the frequency interpolation component contains a spline filter. Different filter coefficients can be used when different pilot patterns (different d, pilot pattern repetition period in time.

Figure 8:
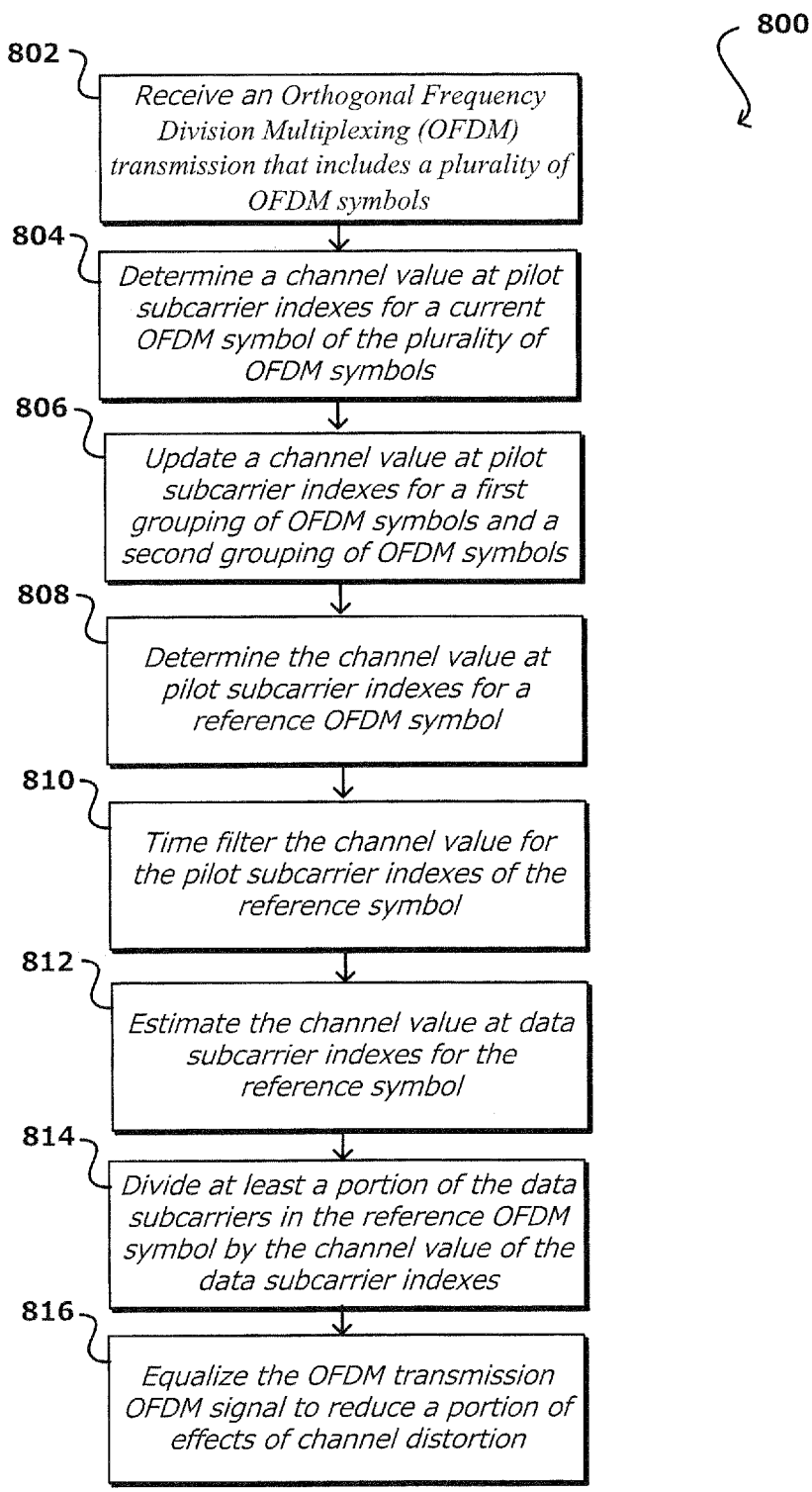
FIG. 8 illustrates an example process for pilot assisted channel estimation in accordance with various embodiments.

FIG. 8 illustrates an example process 800 for pilot assisted channel estimation in accordance with various embodiments. It should be understood that, for any process discussed herein, there can be additional, fewer, or alternative steps performed in similar or alternative orders, or in parallel, within the scope of the various embodiments unless otherwise stated. An Orthogonal Frequency Division Multiplexing (OFDM) transmission that includes a plurality of OFDM symbols is received 802, each one of the plurality of OFDM symbols including data subcarriers and pilot subcarriers. A channel estimation block including a plurality of components (e.g., multiple FFT output memories, a pilot sign correction component, an update channel estimation component, a temporal interpolation component, a time filtering component, a frequency interpolation component, and an equalizer) can buffer the OFDM symbols up to a pre-defined number (e.g. d) after the Fast Fourier Transform was applied. A channel value at pilot subcarrier indexes for a current OFDM symbol of the plurality of OFDM symbols can be determined 804. The channel value at pilot subcarrier indexes for a first grouping of OFDM symbols of the plurality of OFDM symbols and a second grouping of OFDM symbols of the plurality of OFDM symbols can be updated 806 based at least in part on the channel value at the pilot subcarrier indexes of the current OFDM symbol (i.e., the $d_{th}$ received OFDM symbol). In accordance with various embodiments, the first grouping of OFDM symbols can correspond to a predetermined number of OFDM symbols received prior to the current OFDM symbol and the second grouping of OFDM symbols can correspond to OFDM symbols received after the reference OFDM symbol.

The channel value can be determined 808 at pilot subcarrier indexes for a reference OFDM symbol (i.e., the n-$d_{th}$ received OFDM symbol) by computing a weighted average of the channel value of the pilot subcarrier indexes for the first grouping of OFDM symbols and the channel value of the pilot subcarrier indexes for the second grouping of OFDM symbols. In various embodiments, the reference OFDM symbol is received prior to the current OFDM symbol, the reference OFDM symbol being received an amount corresponding to the predetermined number of OFDM symbols. In various embodiments, the predetermined number of OFDM symbols (i.e., "d") can correspond to a repetition period. As described, the number of memory components can depend on a repetition period of the pilot subcarrier patterns of the OFDM transmission. In various embodiments, the repetition period can be set by a transmitter of the OFDM transmission. For example, the transmitter can determine which one of a plurality of pilot patterns is suitable for a specific transmission and can store information indicated of the pilot pattern in a header portion of the OFDM transmission.

The channel value for the pilot subcarrier indexes of the reference symbol is time filtered 810. Using at least one frequency interpolation function, the channel value at data subcarrier indexes for the reference symbol can be estimated 812 based at least in part on the channel value for the pilot subcarrier indexes of the reference symbol. Thereafter, at least a portion of the data subcarriers in the reference OFDM symbol is divided 814 by the channel value of the data subcarrier indexes to equalize 816 the OFDM transmission and reduce a portion of channel distortion.

Various embodiments discussed or suggested herein may be conveniently implemented using a conventional general purpose or a specialized digital computer or microprocessor programmed according to the teachings of the present disclosure. These devices also can include other electronic devices, such as dummy terminals, thin-clients, gaming systems, and other devices capable of communicating via a network. Appropriate software coding can readily be prepared by skilled programmers based on the teachings of the present disclosure, as will be apparent to those skilled in the software art.

Such devices also can include a computer-readable storage media having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. The computer-readable storage media can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed. Based on the disclosure and teachings provided herein, a person of ordinary skill in the art will appreciate other ways and/or methods to implement the various embodiments.

The foregoing description of embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A method, comprising:
   receiving an Orthogonal Frequency Division Multiplexing (OFDM) transmission that includes a plurality of OFDM symbols, each one of the plurality of OFDM symbols including data subcarriers and pilot subcarriers;
   determining a channel value at pilot subcarrier indexes for a current OFDM symbol of the plurality of OFDM symbols;
   updating, based at least in part on the channel value at the pilot subcarrier indexes of the current OFDM symbol, the channel value of pilot subcarriers indexes for a first grouping of OFDM symbols of the plurality of OFDM symbols and a second grouping of OFDM symbols of the plurality of OFDM symbols;
   determining a channel value at pilot subcarrier indexes for a reference OFDM symbol by computing a weighted average of the channel value of the pilot subcarrier indexes for the first grouping of OFDM symbols and the channel value of the pilot subcarrier indexes for the second grouping of OFDM symbols;
   time filtering the channel value for the pilot subcarrier indexes of the reference symbol;
   estimating, using at least one frequency interpolation function, the channel value at data subcarrier indexes for the reference symbol based at least in part on the channel value for the pilot subcarrier indexes of the reference symbol; and
   dividing at least a portion of the data subcarriers in the reference OFDM symbol by the channel value of the data subcarrier indexes to equalize the OFDM transmission and reduce a portion of channel distortion.

2. The method of claim 1, further comprising:
   performing a Fast Fourier Transform on the plurality of OFDM symbols; and
   buffering the plurality of OFDM symbols up to a predetermined number.

3. The method of claim 1, wherein the first grouping of OFDM symbols correspond to a predetermined number of OFDM symbols received prior to the current OFDM symbol, and wherein the second grouping of OFDM symbols correspond to OFDM symbols received after the reference OFDM symbol.

4. The method of claim 3, wherein the reference OFDM symbol is received prior to the current OFDM symbol, the reference OFDM symbol being received an amount corresponding to the predetermined number of OFDM symbols.

5. The method of claim 1, further comprising:
determining a repetition period of the OFDM transmission, the repetition period being indicative of a pilot pattern of the OFDM transmission and included in a header portion of the OFDM transmission; and
associating a set of weights with at least one frequency interpolation function based at least in part on the repetition period.

6. The method of claim 1, wherein determining the channel value at the pilot subcarrier indexes for the current OFDM symbol of the plurality of OFDM symbols includes:
dividing a gain and a phase of pilot subcarriers of the current OFDM symbol by a predetermined gain and predetermined phase associated with the current OFDM symbol.

7. The method of claim 1, further comprising:
determining a weighted average of the first grouping of OFDM symbols and the second grouping of OFDM symbols at pilot locations, the first grouping being obtained from OFDM symbols that are received prior to the reference symbol and the second grouping being obtained from OFDM symbols that are received after the reference symbol; and
determining a channel value at pilot subcarrier indexes for the reference symbol based at least in part on the weighted average of the first grouping of OFDM symbols and the second grouping of OFDM symbols.

8. The method of claim 1, wherein weights used in the weighted average are based at least in part on an order in which the plurality of OFDM symbols are received, wherein a first OFDM symbol received before a second OFDM symbol is weighted higher than the second OFDM symbol.

9. The method of claim 1, wherein the OFDM transmission includes at least a first, a second, and a third OFDM symbol, the first OFDM symbol including first data subcarriers and first pilot subcarriers, the second OFDM symbol including second data subcarriers and second pilot subcarriers, and the third OFDM symbol including third data subcarriers and third pilot subcarriers, the first, the second, and the third pilot subcarriers being positioned in the OFDM transmission at different positions, wherein the method further includes:
computing a first FFT of the first OFDM symbol to generate a first output, the first output being stored in a first memory component;
computing a second FFT of the second OFDM symbol to generate a second output, the second output being stored in a second memory component; and
computing a third FFT of the third OFDM symbol to generate a third output, the third output being stored in a third memory component,
wherein the first, the second, and the third OFDM symbol are used to estimate the channel value at data subcarrier indexes for the reference OFDM symbol.

10. The method of claim 9, wherein a number of memory components used is based at least in part on a repetition period of the OFDM transmission.

11. A receiver, comprising:
a channel estimation component;
at least one computing device processor;
a memory device including instructions that, when executed by the at least one computing device processor, enable the receiver to:
receive an Orthogonal Frequency Division Multiplexing (OFDM) transmission that includes a plurality of OFDM symbols, each one of the plurality of OFDM symbols including data subcarriers and pilot subcarriers, wherein the channel estimation component is configured to:
determine a channel value at pilot subcarrier indexes for a current OFDM symbol of the plurality of OFDM symbols;
update, based at least in part on the channel value at the pilot subcarrier indexes of the current OFDM symbol, the channel value of pilot subcarriers indexes for a first grouping of OFDM symbols of the plurality of OFDM symbols and a second grouping of OFDM symbols of the plurality of OFDM symbols;
determine a channel value at pilot subcarrier indexes for a reference OFDM symbol by computing a weighted average of the channel value of the pilot subcarrier indexes for the first grouping of OFDM symbols and the channel value of the pilot subcarrier indexes for the second grouping of OFDM symbols;
time filter the channel value for the pilot subcarrier indexes of the reference symbol;
estimate, using at least one frequency interpolation function, the channel value at data subcarrier indexes for the reference symbol based at least in part on the channel value for the pilot subcarrier indexes of the reference symbol; and
divide at least a portion of the data subcarriers in the reference OFDM symbol by the channel value of the data subcarrier indexes to equalize the OFDM transmission and reduce a portion of channel distortion.

12. The receiver of claim 11, wherein the OFDM transmission is received at a Fast Fourier Transform component (FFT).

13. The receiver of claim 11, wherein the channel estimation component is further configured to:
perform a Fast Fourier Transform on the plurality of OFDM symbols; and
buffer the plurality of OFDM symbols up to a predetermined number.

14. The receiver of claim 11, further comprising:
a pilot sign correction component, the pilot sign correction component configured to at least divide a gain and a phase of pilot subcarriers of the current OFDM symbol by a predetermined gain and predetermined phase associated with the current OFDM symbol.

15. The receiver of claim 11, wherein the channel estimation component is further configured to:
determine a repetition period of the OFDM transmission, the repetition period being indicative of a pilot pattern of the OFDM transmission and included in a header portion of the OFDM transmission; and
associate a set of weights with the frequency interpolation function based at least in part on a repetition period.

16. The receiver of claim 11, wherein the first grouping of OFDM symbols correspond to a predetermined number of OFDM symbols received prior to the current OFDM symbol, and wherein the second grouping of OFDM symbols correspond to OFDM symbols received after the reference OFDM symbol.

17. The receiver of claim 11, further comprising an update channel estimation component, the update channel estimation component configured to:
determine a weighted average of the first grouping of OFDM symbols and the second grouping of OFDM symbols at pilot locations, the first grouping being obtained from OFDM symbols that are received prior to the reference symbol and the second grouping being obtained from OFDM symbols that are received after the reference symbol; and determine a channel value at pilot subcarrier indexes for the reference symbol based at least in part on the weighted average of the first grouping of OFDM symbols and the second grouping of OFDM symbols.

18. The receiver of claim 11, wherein weights used in the weighted average are based at least in part on an order in which the plurality of OFDM symbols are received, wherein a first OFDM symbol received before a second OFDM symbol is weighted higher than the second OFDM symbol.

19. The receiver of claim 11, wherein the frequency interpolation function includes a spline filter, and wherein weights associated with the spline filter are based at least in part on a repetition period of the OFDM transmission.

20. A non-transitory computer readable storage medium storing one or more sequences of instructions executable by one or more processors to perform a set of operations comprising:

receiving an Orthogonal Frequency Division Multiplexing (OFDM) transmission that includes a plurality of OFDM symbols, each one of the plurality of OFDM symbols including data subcarriers and pilot subcarriers;

determining a channel value at pilot subcarrier indexes for a current OFDM symbol of the plurality of OFDM symbols;

updating, based at least in part on the channel value at the pilot subcarrier indexes of the current OFDM symbol, the channel value of pilot subcarriers indexes for a first grouping of OFDM symbols of the plurality of OFDM symbols and a second grouping of OFDM symbols of the plurality of OFDM symbols;

determining a channel value at pilot subcarrier indexes for a reference OFDM symbol by computing a weighted average of the channel value of the pilot subcarrier indexes for the first grouping of OFDM symbols and the channel value of the pilot subcarrier indexes for the second grouping of OFDM symbols;

time filtering the channel value for the pilot subcarrier indexes of the reference symbol;

estimating, using at least one frequency interpolation function, the channel value at data subcarrier indexes for the reference symbol based at least in part on the channel value for the pilot subcarrier indexes of the reference symbol; and dividing at least a portion of the data subcarriers in the reference OFDM symbol by the channel value of the data subcarrier indexes to equalize the OFDM transmission and reduce a portion of channel distortion.

* * * * *